(12) United States Patent
Warner

(10) Patent No.: US 6,381,850 B1
(45) Date of Patent: May 7, 2002

(54) WIRE STRIPPING AND PREPARATION APPARATUS

(76) Inventor: Ted Warner, 116 Gold Rock Ct., Folsom, CA (US) 95630

( * ) Notice: Subject to any disclaimer, the term of this patent is extended or adjusted under 35 U.S.C. 154(b) by 0 days.

(21) Appl. No.: 09/523,918

(22) Filed: Mar. 9, 2000

Related U.S. Application Data

(60) Provisional application No. 60/123,448, filed on Mar. 9, 1999.

(51) Int. Cl.$^7$ ................................................ B21F 13/00
(52) U.S. Cl. ........................................ 30/90.6; 30/90.4
(58) Field of Search ................................ 30/90.6, 90.4; 81/9.4, 9.44

(56) References Cited

U.S. PATENT DOCUMENTS 3,623,384 A * 11/1971 Murphy ................... 30/90.6 X

* cited by examiner

Primary Examiner—Douglas D. Watts
(74) Attorney, Agent, or Firm—John P. O'Banion

(57) ABSTRACT

A cable stripping tool for the preparation of high voltage cable for termination or splicing by simultaneously removing the semiconducting sheathing from a section of cable and insulation and sheathing from the end section of the cable to expose the conducting core. The tool has a tubular body with a central bore which receives the cable. The body has an adjustable scoring blade disposed in a longitudinal slot which scores the sheathing at a predetermined distance. An insulation cutting blade is radially disposed in the central bore which cuts the sheathing and insulation upon rotation of the body. In one embodiment, a shaft is coupled to the tubular body to provide rotation of the body about the cable by a drill motor.

19 Claims, 10 Drawing Sheets

WIRE STRIPPING AND PREPARATION APPARATUS

CROSS-REFERENCE TO RELATED APPLICATIONS

This application claims priority from U.S. Provisional Application Ser. No. 60/123,448 filed on Mar. 9, 1999 which is incorporated herein by reference.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention pertains generally to the installation of underground cables, and more particularly to an apparatus for stripping the insulation and semiconducting sheathing from an underground cable in preparation for termination or splicing of the cable.

2. Description of the Background Art

Conductive wires or cables typically have a central conductive core surrounded by one or more layers of insulation and an outer sheath. High voltage electrical cables typically have a semi-conductive outer sheath. Other cables may also have a second conductive layer separated from the conductive core by a layer of insulation. Stripping the end of the cable is necessary to allow an electrical or light energy connection with the cable.

Present wire or cable stripping tools known in the art range from simple hand tools to sophisticated motorized machinery. One type of prior art wire stripping tool is a plier like device with notches in the jaws which form a diamond shaped aperture when the jaws are fully closed. The wire to be stripped is placed in one notch and the jaws are closed cutting the insulation and allowing the conductive wire to be withdrawn through the aperture and the insulating sheathing removed thereby. However, the plier type wire strippers known in the art are unsuitable for stripping two levels of insulation or for stripping wires with a comparatively large cross-sectional areas.

Another common problem encountered with hand wire stripping tools is that the gripping and stripping of the insulation may cause damage to the conductor. The conductor may be cut completely or nicked thereby reducing the capability of the conductor to conduct current. The notched areas of the conductor may also create hot spots due to concentrations of current as well as weak spots that can result in breakage of the conductor. It has therefore become a practice to leave a small amount of insulation on the cable to be removed by hand so that the conductor is not exposed to or notched by the cutting blade. Care must also be taken when removing the semi-conductive sheathing from a high voltage cable not to cut the insulation layer or to imbed pieces of the sheathing into the insulation layer.

Other well known wire strippers have an elongate body with cutting blades which rotate about the exterior of the cable to remove the outer sheath of the cable. Such devices can be rotated by hand or rotated by an electric motor. One deficiency in these types of strippers with a permanently fixed blade is that the stripper cannot accommodate a range of cable insulation diameters. Another deficiency in the prior art hand actuated and motorized stripping devices is that the devices can not be efficiently used in confined spaces.

Accordingly, there is a need for a motorized cable stripping device which provides for removal of the sheathing layer of a portion of the cable without cutting the insulation while the end portion of the cable has the sheath and insulation layers removed to expose the conductive core, and which is easy to use and can be used in a confined space. The present invention satisfies those needs, as well as others, and generally overcomes the deficiencies found in the background art.

BRIEF SUMMARY OF THE INVENTION

The present invention generally comprises a cable stripping tool with a cylindrical body having a central bore or hollow throughout its length that can receive the end of the cable to be stripped. The cylindrical body has a longitudinal slot and a laterally disposed discharge port which extends through the walls of body to the central bore. An insulation cutting blade is mounted in the discharge port extending into the central bore and configured so as to remove the sheathing and insulation layers of a cable. The discharge port is preferably positioned near the middle of the length of the device.

A scoring blade assembly is disposed above and in the longitudinal slot such that the tip of the scoring blade engages and rides the outer sheath of the cable when it is placed in the central bore. A spring maintains pressure on the scoring blade. An adjustable set screw maintains the depth of the score which does not fully penetrate the sheath. The blade assembly is preferably adjustable and can be positioned at any point along a raceway above the slot.

A shaft assembly is mounted opposite the cable receiving end of the elongate body and centered along the central axis of the generally cylindrical body.

In use, the cable is inserted into the opening in the open end of the body. A portable drill or other source of rotational power is attached to the shaft. When rotational power is applied to the apparatus, it rotates around the cable, thus stripping the sheath and insulator from a section of the cable with the insulation cutting blade and scoring the semiconducting layer of another section with the scoring blade. The scored sheath is then peeled by hand after scoring to avoid cutting the insulation layer.

It is an object of the invention to provide a novel means of preparing insulated cable having at least one insulation layer and a sheath for splicing or termination.

Another object of the invention is to provide a cable stripping device that can accommodate insulated cable with a comparatively wide diameter.

Yet another object of the invention is to provide a wire stripping device that is efficient, reliable and easy to use.

A further object of the invention is to provide a cable stripping device with cutting blades that can be adjusted to cut to a range of depths.

Another object of the invention is to provide a cable preparation device that can be readily utilized in confined spaces.

Yet another object of the invention is to provide a cable stripping device which is rugged and simple to fabricate.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Figure 1:
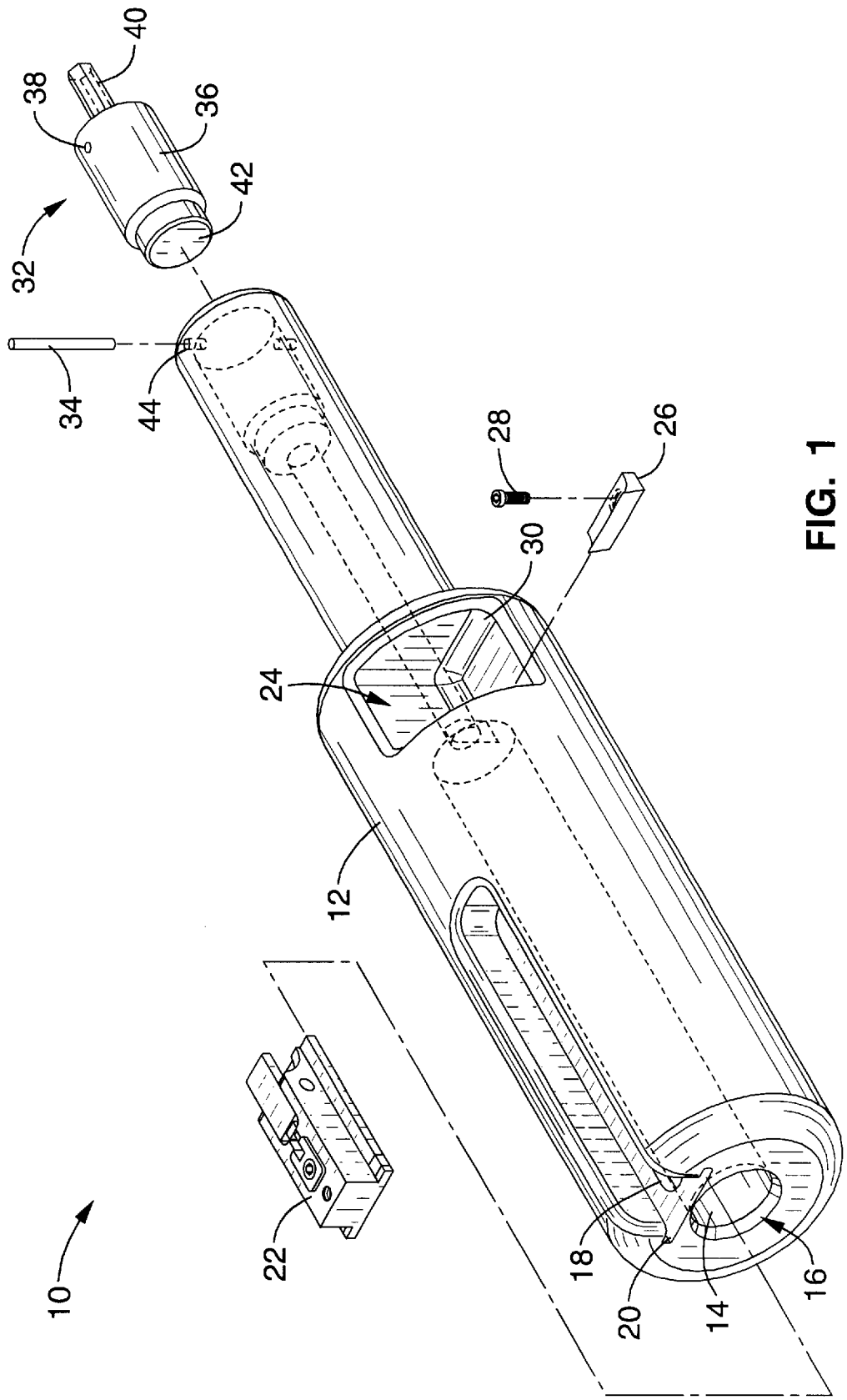
FIG. 1 is an exploded perspective view of a cable stripping and preparation apparatus in accordance with the invention.

Referring more specifically to the drawings, for illustrative purposes the present invention is embodied in the apparatus generally shown in FIG. 1 through FIG. 20, where like reference numerals denote like parts. It will be appreciated that the apparatus may vary as to configuration and as to details of the parts without departing from the basic concepts as disclosed herein.

As can be seen from the drawings, the invention is a device for preparing the ends of high voltage cable or other insulated wire to be spliced or otherwise terminated. Such high voltage cable typically has a central conductive core surrounded by a rubberized or plastic insulating layer and a semi-conductive outer sheath. The present invention exposes the conducting core at the end of the cable while scoring the outer sheath of a portion of the cable.

Figure 2:
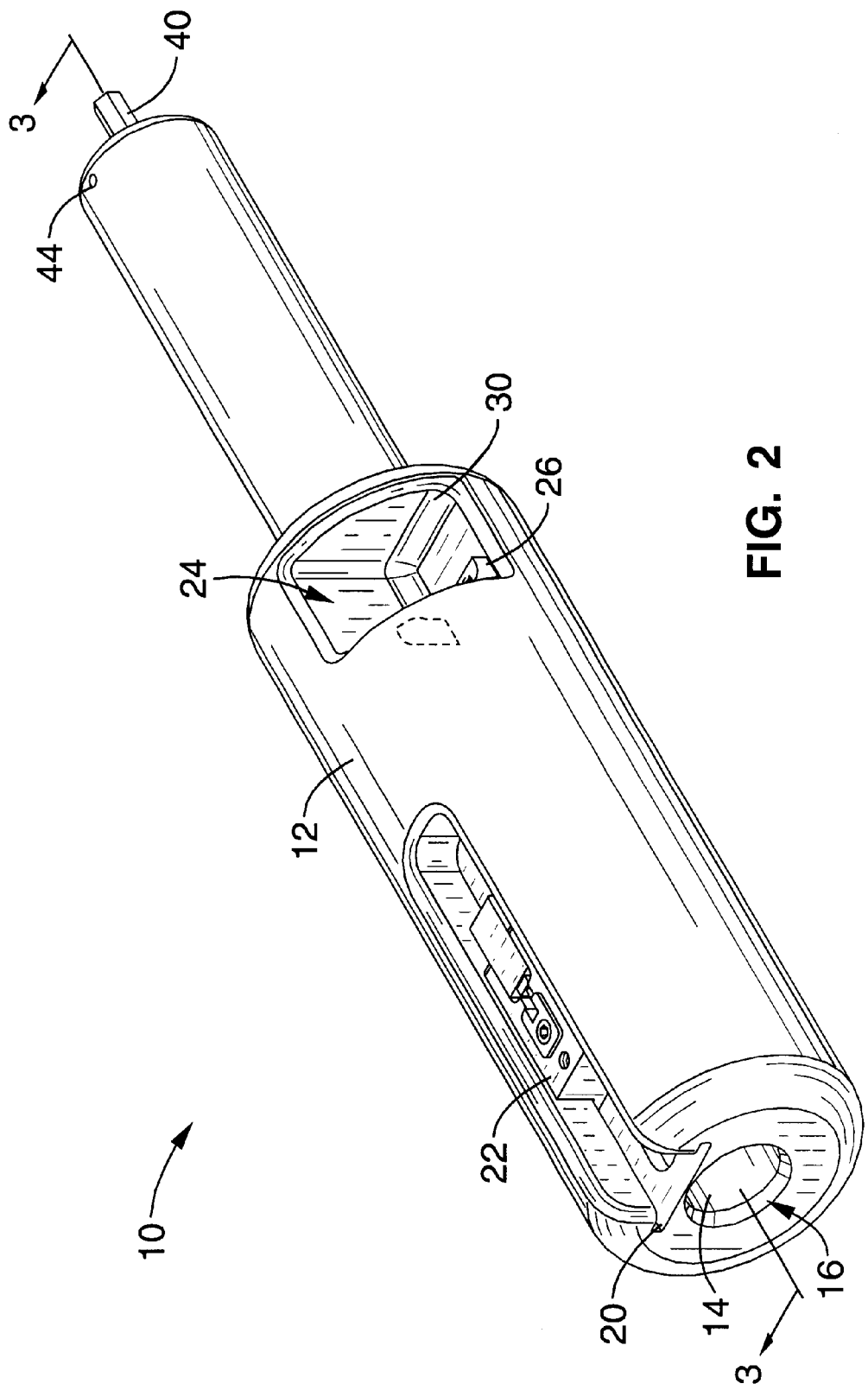
FIG. 2 is a perspective assembled view of a cable stripping and preparation apparatus shown in FIG. 1.
Figure 3:
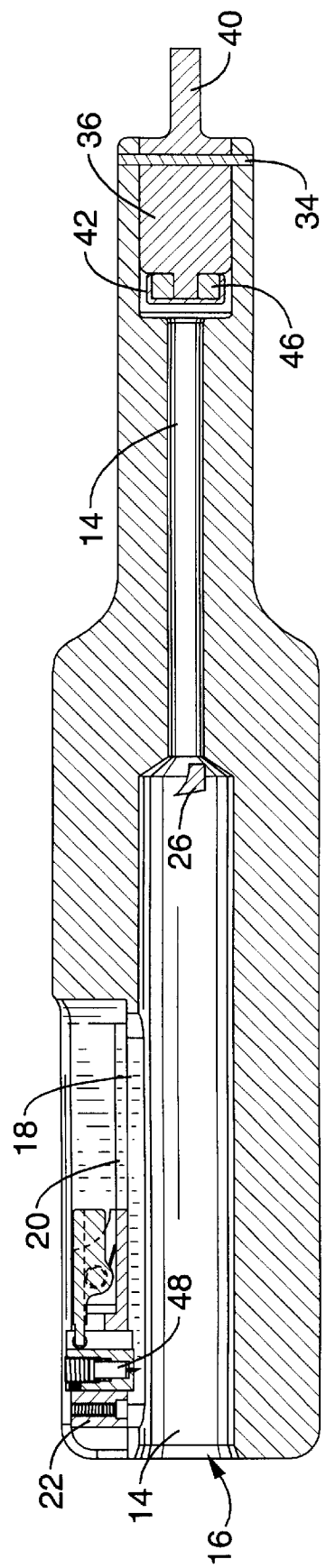
FIG. 3 is a cross sectional view of the apparatus of FIG. 2 taken along the lines 3—3.

Referring now to FIG. 1 through FIG. 3, an embodiment of a wire preparation device 10 in accordance with the present invention is generally shown. The device 10 includes an elongate tubular body 12 with a central channel or bore 14 throughout the length of the body. The bore 14 is preferably centered about a central axis with an opening 16 at one end configured to receive a cable to be stripped and prepared by the device. Body 12 has a longitudinal slot 18 which extends through the exterior wall of do the body 12. Slot 18 is centered within a longitudinal raceway 20 that is also within the wall of body 12. Device 10 also includes a scoring blade assembly 22 which is configured to slide linearly within raceway 20, as seen in FIG. 2.

Cylindrical body 12 also has a laterally disposed discharge port 24 which opens from the central bore 14 to the exterior of the device. An insulation removing blade 26 is mounted in the discharge port 24 with a screw 28 and the blade 26 extends into the central bore 14. As can also be seen FIG. 2 and FIG. 3, the blade 26 is preferably perpendicular to the central axis of the body 12 as well as the longitudinal axis of the cable when it is placed in the central bore 14. The distance that the blade 26 is set to extend into the central bore 14 is determined by the thickness of the outer sheath and insulating layers of the cable and may be adjusted with mounting screw 28. Note that screw 28 fits into an elongated slot in blade 26. Accordingly, the blade 26 can be adjusted to remove the sheath and the insulation layers but not come in contact with the conducting core. The sheath and insulation layers are discharged from the central bore 14 through the discharge port 24 to the exterior of the device.

It is also preferred that the junctions 30 between the walls forming the discharge port 24 be curved to facilitate the efficient discharge of the insulation and sheath layers of the cable during use. The curved junctions 30 between walls of port 24 reduce binding of the discharged material during use.

In the preferred embodiment, a shaft assembly 32 is mounted to body 12 at the end opposite the cable receiving opening 16 by a pin 34. The shaft assembly 32 has a cylindrical body section 36 which fits within a socket in body 12. Shaft assembly 32 has an aperture 38 which is radially disposed through the cylindrical body section 36 to receive pin 34. Shaft assembly 32 also has shaft 40 which can be placed in the chuck of a hand or motorized rotary drill. At the end of shaft assembly 32 opposite shaft 40 is an end cap 42 that covers a bearing 46.

In FIG. 3, it can be seen that when shaft assembly 32 is positioned in the socket of body 12 and body aperture 44 and shaft assembly aperture 38 are aligned and pin 34 inserted, cap 42 is positioned at the distal end of central bore 14. It is preferred that cap 42 cover a cap bearing 46 mounted to the shaft body 36 that will allow the cap 42 to rotate freely and independently of the body 36.

It is preferred that the diameter of opening 16 and bore 14 approximate the diameter of the entire cable and after the insulation cutting blade 26 and discharge port 24 reduce down to a diameter which approximates the diameter of the conducting core of the cable. In this configuration, the reduced diameter of bore 14 maintains the proper alignment of the conductor core with respect to cutting blade 26 as the insulation is incrementally removed.

It will also be seen from FIG. 3 that it is preferred that insulation cutting blade 26 be positioned ninety degrees relative to the scoring blade assembly 22. However, other positions are also contemplated by the invention.

During use, a cable is placed within bore 14 through opening 16 until it impacts blade 26. In one embodiment, the blade of the scoring blade assembly 22 can be withdrawn from bore 14 to allow free access of the cable through bore 14 without nicking the exterior semi-conductive sheathing of the cable.

Since the base of the adjustable scoring blade assembly 22 fits into a raceway 20 centered over the longitudinal slot 18, the scoring blade 48 can engage the side of the cable within the bore 14. The scoring blade assembly 22 can be adjusted to any position along the raceway 20 so that the operator can select the amount of cable sheathing to be scored. Shaft 40 is preferably placed into the chuck of a motorized rotary drill and rotated. It will be appreciated that rotation of shaft 40 will result in the rotation of the entire body 12 around the cable workpiece. Insulation and exterior sheathing are discharged through discharge port 24 when cut by blade 26 and the interior core conductor proceeds into the distal portion of bore 14. At the same time, the semi-conductive sheathing is scored by scoring blade 48. When the conductor reaches the end of bore 14 it impacts cap 42. Cap 42 remains stationary with respect to the cable while the shaft cylindrical body 36 and elongate body 12 rotate around the cable. Consequently, the end of the conductor is not exposed to rotational forces when it comes in contact with cap 42. This is important if the conductor is composed of twisted multiple strands. Once the conductor reaches the cap 42 the operator ceases rotation of the device and the cable end is removed from the device.

Figure 4:
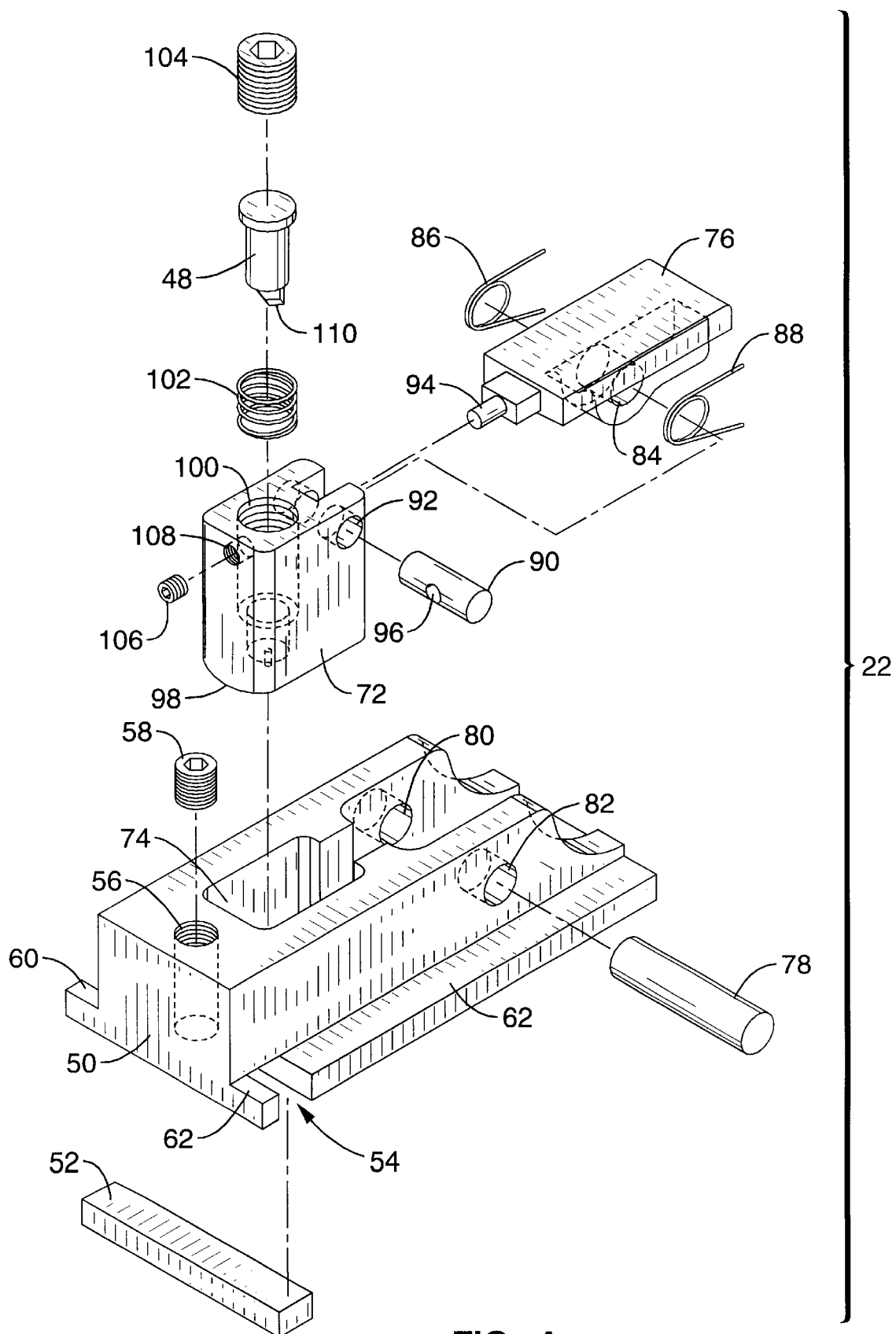
FIG. 4 is an exploded perspective view of the adjustable scoring blade assembly used in the apparatus shown in FIG. 1.

Referring now to FIG. 4, an exploded view of the preferred scoring blade assembly 22 is depicted. The scoring blade assembly preferably has a generally inverted "T" shaped base 50 of dimensions that are slightly smaller than the dimensions of raceway 20 so as to freely slide along the length of the raceway without substantial movement of the base to either side of raceway 20. An anchor member 52 of approximately the same width of base 50 fits into a channel 54 in base 50. A threaded aperture 56 allows screw 58 to engage the top surface of anchor member 52 and direct member 52 toward the bottom of raceway 20 and, at the same time, force left side rail 60 and right side rail 62 into frictional engagement with the corresponding surfaces of the sidewalls of raceway 20. Thus, the scoring blade assembly 22 can be positioned at any point along raceway 20 and anchored in position with anchor screw 58.

Figure 5:
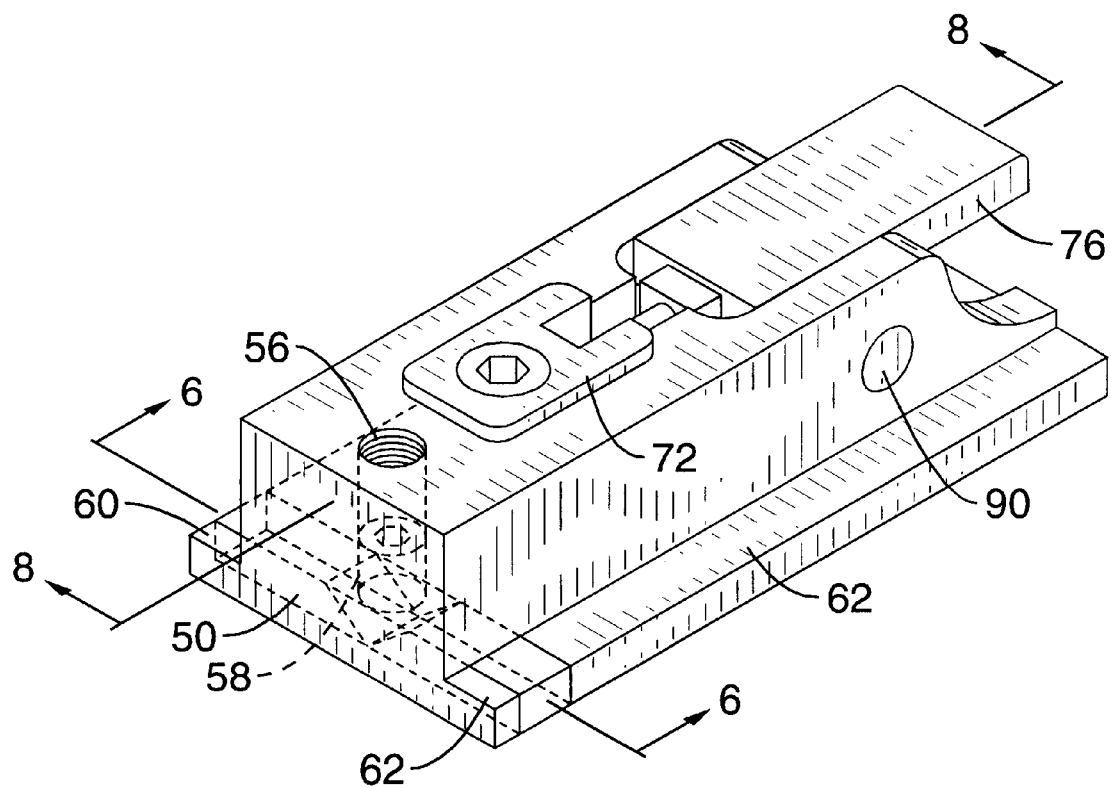
FIG. 5 is an assembled perspective view of an alternative embodiment of the adjustable scoring blade assembly shown in FIG. 4 that employs paired anchor members.
Figure 6:
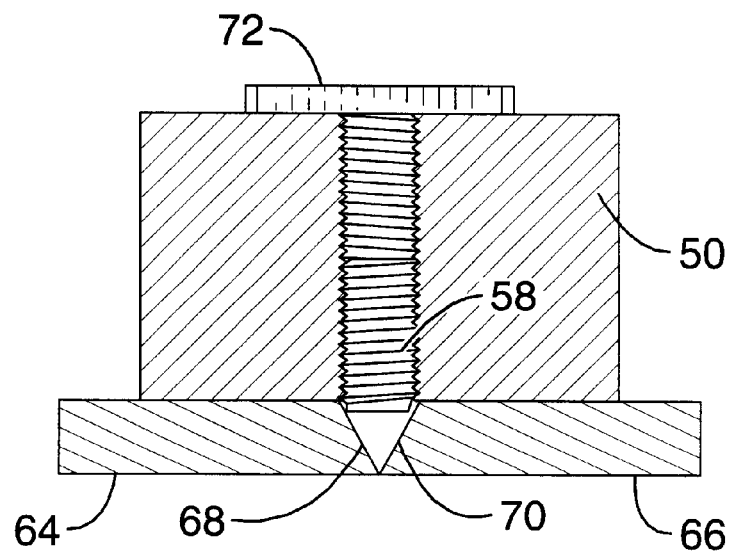
FIG. 6 is a cross-sectional view of the scoring blade assembly shown in FIG. 5 taken through lines 6—6 with the paired anchor members in the unextended position.
Figure 7:
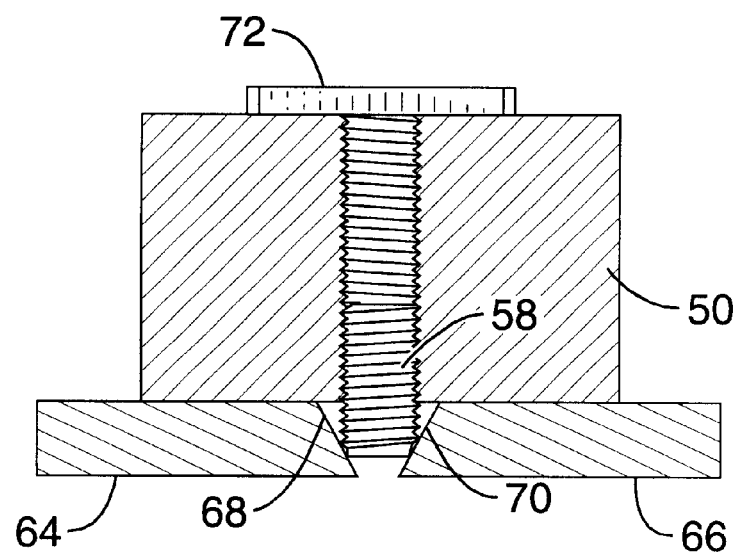
FIG. 7 is a cross-sectional view showing the anchor members in FIG. 6 in the extended position.

Referring also to FIG. 5, FIG. 6 and FIG. 7, an alternative embodiment of the anchor member is disclosed. In this embodiment, left 64 and right 66 anchor members are shown in the disengaged and engaged positions, respectively. The anchor screw 58 engages beveled edges 68 and 70 of anchor members 64 and 66, respectively. As seen in the engaged position of FIG. 7, anchor members 64,66 are forced laterally into the sidewalls of raceway 20 by anchor screw 58.

Referring to FIG. 4 and FIG. 5, the scoring blade assembly 22 also includes a blade column 72 which slides in sleeve 74 of base 50. A pivot arm 76 is preferably coupled to base 50 with pivot pin 78 through pivot pin apertures 80, 82 in base 50 and aperture 84 in pivot arm 76. Springs 86,88 are preferably positioned on either side of aperture 84 with the spring elements engaging both the pivot arm 76 and the base 50. The springs 86,88 thereby bias the pivot arm 76 upwardly and the blade column 72 downwardly.

Pivot arm 76 is preferably coupled with blade column 72 by a cylindrical pin 90 which can rotate within holes 92 in blade column 72. In the embodiment shown, pivot arm 76 has a finger 94 which fits into a similarly sized hole 96 in pin 90. It can be seen that pivotal movement of pivot arm 76 about pivot pin 78 results in the corresponding movement of blade column 72 within sleeve 74.

Blade column 72 preferably has a gently arcuate surface 98 on the bottom section of the column. Column 72 also has a blade chamber 100 which is preferably threaded. Scoring blade 48 and blade spring 102 are placed into chamber 100 and secured into place by blade retaining screw 104. In order to restrict movement of screw 104 during operation of the device, a screw 106 is secured into threaded aperture 108 and engages or restricts movement of screw 104. In addition, blade spring 102 is preferably not fully compressed when blade 48 is positioned by screw 104.

Figure 8:
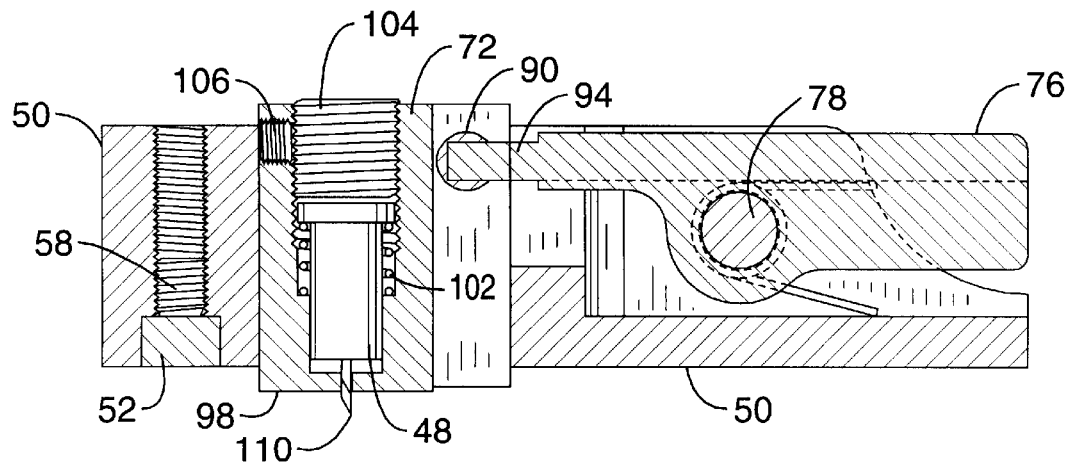
FIG. 8 is a cross-sectional view of the scoring blade assembly of FIG. 5 taken through lines 8—8 with the scoring blade and blade housing shown in the down position.

FIG. 8 is a cross-sectional view of the scoring blade assembly 22 taken along the line 8—8 of FIG. 5. In FIG. 8, blade assembly 22 is shown in the down or cable engaging position. It will be appreciated that the cutting tip 110 of blade 48 and arcuate surface 98 of blade column 72 are disposed in the central bore 14 through slot 18 when in the down position. It will be apparent to one skilled in the art that the blade column 72 can slide up and down in sleeve 74 when the blade 48 and blade column 72 encounter a cable that is not perfectly circular. Such movement is resisted by springs 86, 88, which also serve to keep the tip 110 of scoring blade 48 fully engaged with the cable when the device is in use.

Figure 9:
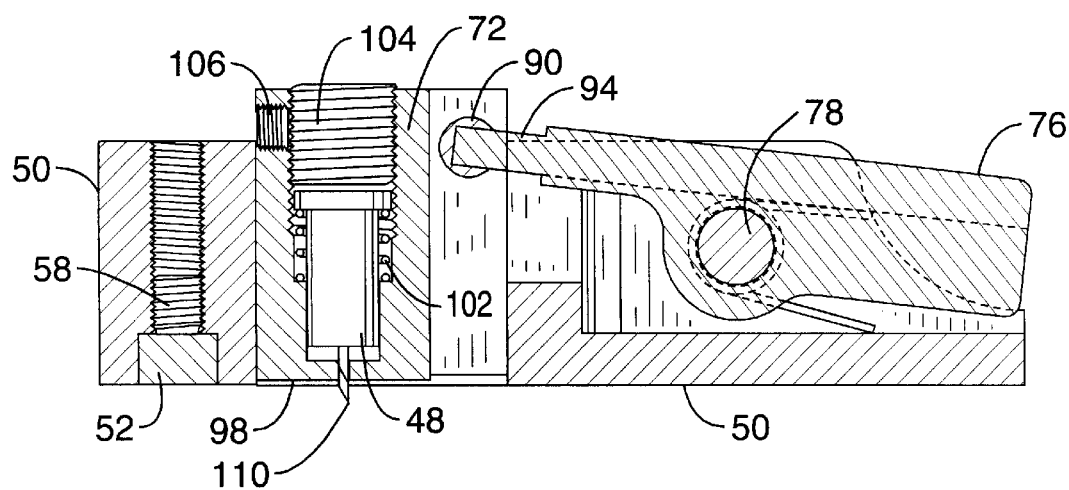
FIG. 9 is a cross-sectional view showing the scoring blade and blade housing of FIG. 8 in the up or disengaged position.
Figure 10:
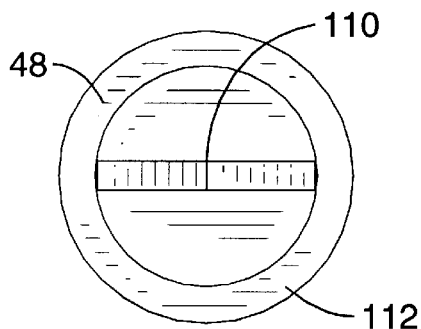
FIG. 10 is a top view of the scoring blade shown in FIG. 4.
Figure 11:
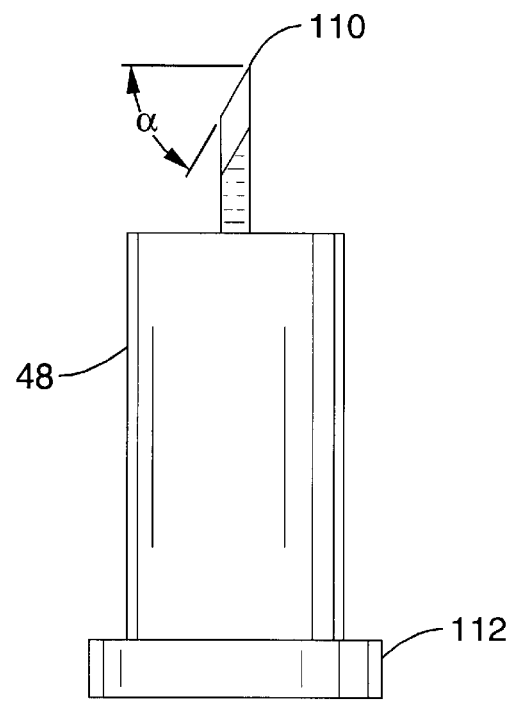
FIG. 11 is a side view of the scoring blade shown in FIG. 4 showing the preferred blade angle.
Figure 12:
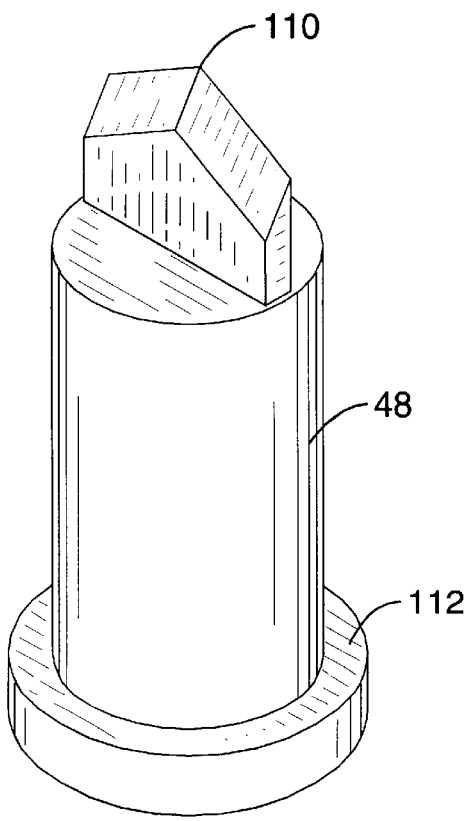
FIG. 12 is a perspective view of the scoring blade shown in FIG. 4.

Referring now to FIG. 9, a cross-sectional view of the scoring blade assembly in the up or disengaged position can be seen. The downward movement of pivot arm 76 results in the upward movement of blade column 72 and blade 48 is withdrawn from bore 14 and slot 18. Removal of the scoring blade from bore 14 is important for the protection of the scoring blade 48 during initial placement of the cable in the device as well as removal of the cable once the insulation stripping and scoring are completed. Removal of the scoring blade 48 from the bore is also important so that tip 110 of blade 48 does not nick the semiconducting sheath of the cable or the conductor during removal. Accordingly, pivot arm 76 is depressed to raise blade column 72 during placement and removal of the cable.

Top, side and perspective views of the preferred structure of scoring blade 48 are shown in FIG. 10 through FIG. 13. As seen in the side view of blade 48 in FIG. 11, the preferred angle is approximately 60° from horizontal. However, a range of blade angles from 30° to 75° has been found to be effective.

Figure 13:
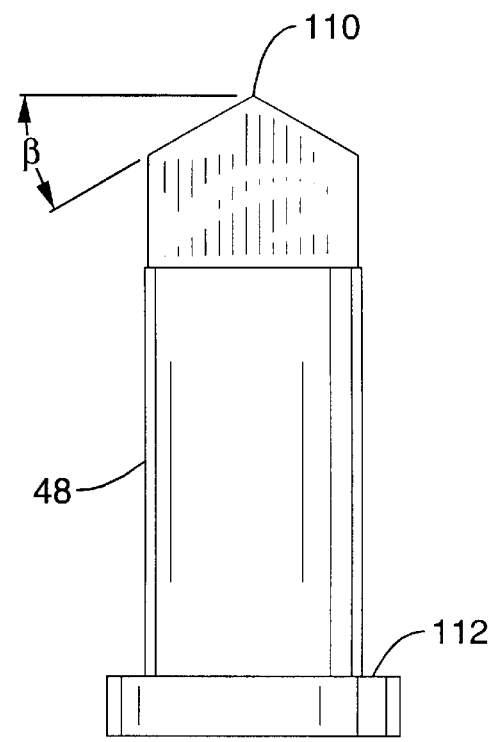
FIG. 13 is a rear view of the scoring blade shown in FIG. 1 showing the preferred angle forming the tip.
Figure 14:
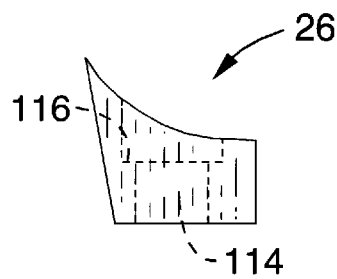
FIG. 14 is an end view of the insulation cutting blade of the apparatus shown in FIG. 1.
Figure 15:
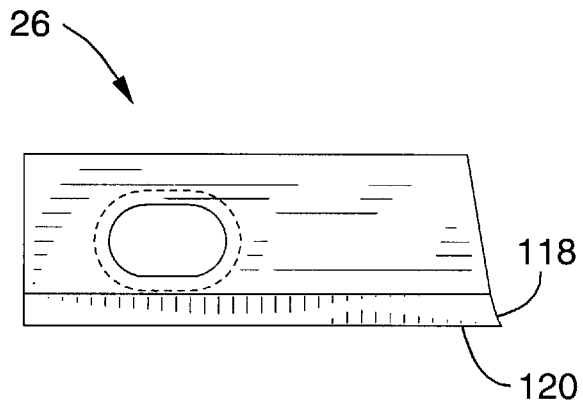
FIG. 15 is a top view of the insulation cutting blade of the apparatus shown in FIG. 1.
Figure 16:
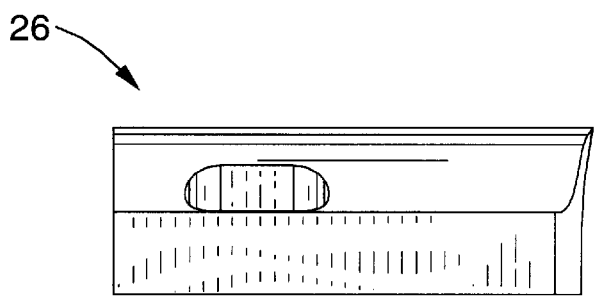
FIG. 16 is a rear view of the insulation cutting blade of the apparatus shown in FIG. 1.

Referring now to FIG. 13, the angle β of the blade forming tip 110 of blade 48 is preferably approximately 30° from horizontal as shown. However, angles ranging from 15° to 60° have been found to be effective in reducing wandering of the tip 110 of blade 48 during scoring.

In addition, blade 48 preferably has a base ridge 112 on the end of the blade opposite the tip 110 which is greater in diameter than the body of the blade to seat spring 102 as well as engage screw 104.

Referring to FIG. 1 and FIG. 14 through FIG. 17, end, rear, top and perspective views of the insulation cutting blade 26 are shown. In the embodiment shown, the cutting depth of cutting blade 26 can be adjusted. Screw 28 can be placed in a slot 114 with a shelf 116 to engage the head of screw 28 and secure blade 26 to discharge port 24 of body 12. In this configuration, screw 28 can be loosened and the radial position of blade 26 with respect to the center of central bore 14 can be adjusted outwardly to remove less insulation and inwardly to remove more. If blade 26 is cutting into the conducting core of the cable, the blade should be adjusted out and secured by screw 28.

Figure 17:
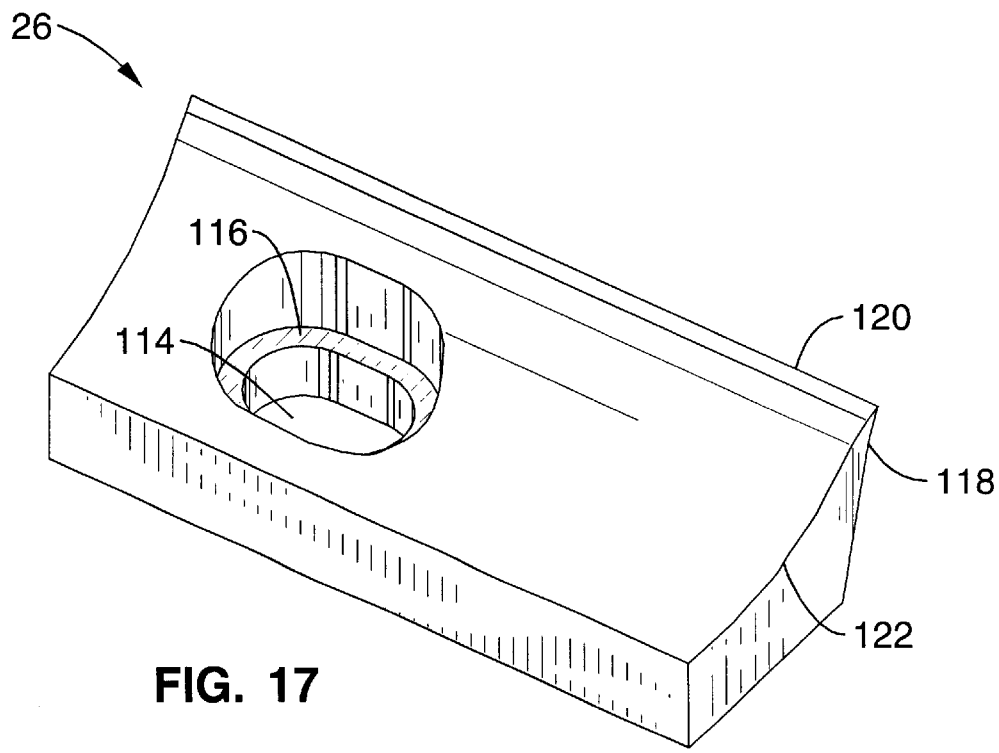
FIG. 17 is a rear perspective view of the insulation cutting blade of the apparatus shown in FIG. 1 showing the three cutting edges of the blade.

The preferred configuration of insulation cutting blade 26 has three cutting edges: front 118, top 120 and end 122. The end cutting edge 122 is generally parallel to the conductor core during cutting. Top cutting edge 120 is generally perpendicular to the conducting core of the wire during cutting. Front cutting edge 118 of blade 26 preferably has a ridge near the converging points of the front, top and side cutting edges as seen in FIG. 17.

Figure 18:
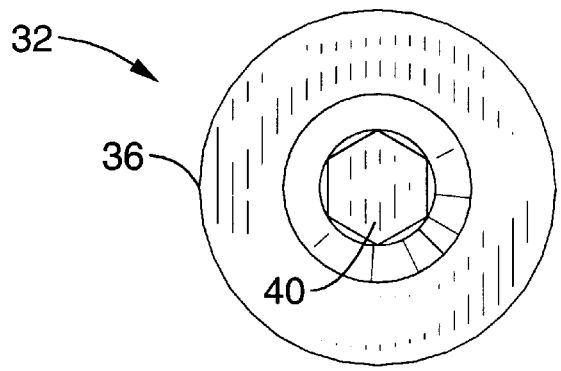
FIG. 18 is an end view of the shaft assembly portion of the of the apparatus shown in FIG. 1.
Figure 19:
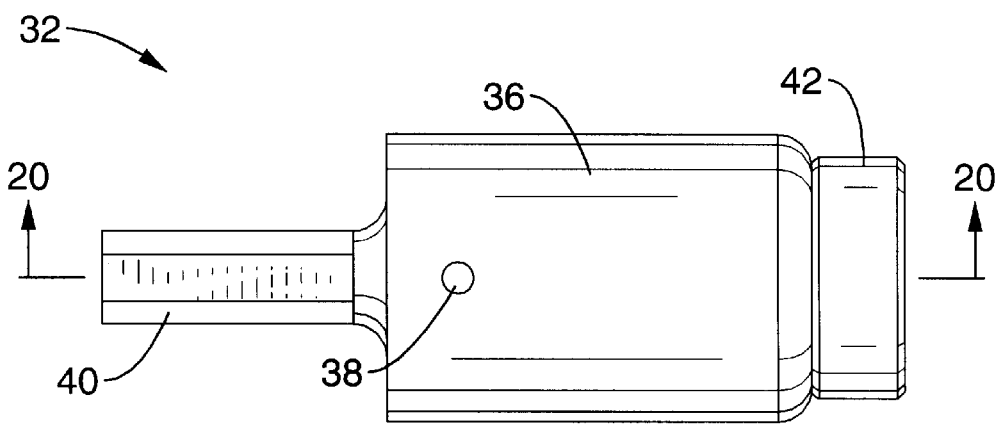
FIG. 19 is a side view of the shaft assembly portion of the of the apparatus shown in FIG. 1.
Figure 20:
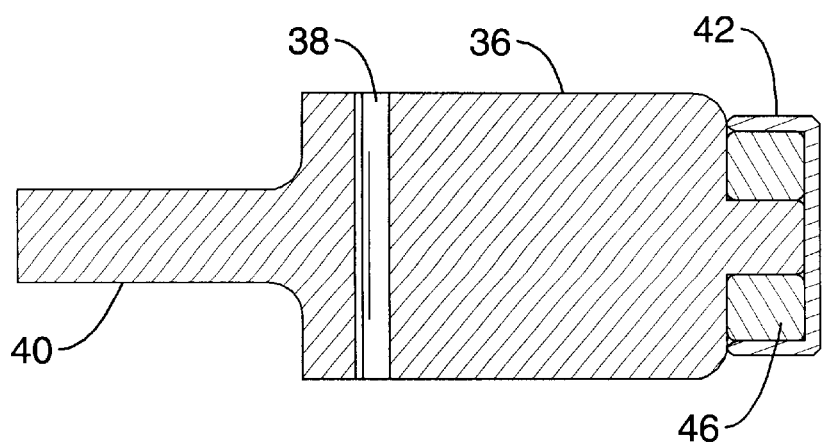
FIG. 20 is a cross-sectional view of the shaft assembly shown in FIG. 19 taken along the lines 20—20 showing the bearing and bearing cap.

Shaft assembly 32 with cylindrical body 36, shaft 40, bearing 46 and cap 42 are shown in FIG. 18 through FIG. 20. As shown in FIG. 1, the shaft assembly 32 is dimensioned to fit in the distal end of elongate body 12. The assembly 32 is secured by pin 34 so that it is quickly removable for easy cleaning. FIG. 20 is a cross-sectional view of the shaft assembly 32 depicted in FIG. 19 taken along the lines 20—20. Bearings 46 allow the cap to remain motionless with respect to the conducting core of the cable while the body rotates around the cable.

Accordingly, it will be seen that this cable stripping and preparation device which can simultaneously score the exterior semi-conductive sheathing for a portion of the cable and remove the sheathing and insulation layers exposing the conductive core of another portion of the cable-prior to splicing or coupling of the cable.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for stripping insulation from a cable, said apparatus comprising:
   (a) an elongate tubular body having a cylindrical bore with an axial opening at one end of said body, said body having a longitudinal raceway;
   (b) a scoring blade assembly slidably disposed in said longitudinal raceway;
   (c) a shank, said shank coupled with the elongate body along a central axis of rotation; and
   (d) an insulation cutting blade mounted to said body, said blade radially disposed within the cylindrical bore of said elongate body.

2. An apparatus as recited in claim 1, wherein said tubular body includes a lateral discharge port extending from the cylindrical bore.

3. An apparatus as recited in claim 2, wherein said insulation cutting blade is mounted in said lateral discharge port within said tubular body.

4. An apparatus as recited in claim 1, wherein said shank further comprises:
   (a) a shaft;
   (b) a shank body coupled to the shaft and to said tubular body; and
   (c) an end cap rotatably coupled with said shank body, said cap disposed within said central bore.

5. An apparatus as recited in claim 4, further comprising a bearing coupled with said shank body and said end cap, said bearing and said cap being capable of independently rotating in relation to said shank body.

6. An apparatus as recited in claim 1, wherein said scoring blade assembly comprises means for firmly securing the position of the assembly in the longitudinal raceway.

7. An apparatus as recited in claim 6, wherein said means for securing the position of the scoring assembly comprises a moveable anchor.

8. An apparatus as recited in claim 1, wherein said scoring blade assembly comprises:
   (a) a blade housing adapted to slide within a bore in a base from a first position to a second position;
   (b) a scoring blade mounted to said blade housing such that the blade can reside in said central bore when the housing is in a first position; and
   (c) means for moving the blade housing from a first position to a second position.

9. An apparatus as recited in claim 8, wherein said means for moving the blade housing comprises a lever arm pivotally mounted to said base and connected to the blade housing such that movement of the lever arm moves the blade housing from a first position to a second position.

10. An apparatus as recited in claim 1, further comprising a bearing disposed in the cylindrical bore at an end opposite the opening, said bearing capable of rotating independently of the elongate body.

11. A cable stripping tool, comprising:
   (a) an elongate tubular body having proximal and distal ends and a central axis, said body having and an opening at the proximal end communicating with a first cylindrical bore and a contiguous second cylindrical bore centered about said central axis; said body having a longitudinal slot and race, said slot extending through said body to the first cylindrical bore; said body having a radial discharge port;
   (b) a shaft coupled with the distal end of the elongate tubular body;
   (c) a scoring blade assembly slidably coupled to said race, said assembly having a scoring blade disposed within said slot and said first cylindrical bore;
   (d) an insulation cutting blade disposed in said radial discharge port, said blade extending in to said first cylindrical bore; and
   (e) a bearing and bearing cap disposed in said second cylindrical bore perpendicular to said central axis.

12. A tool as recited in claim 11, wherein said scoring blade assembly comprises means for securing the position of the assembly in the longitudinal race.

13. A tool as recited in claim 12, wherein said means for securing the position of the assembly comprises a plurality of anchor members brought into frictional engagement with said race in said elongate tubular body.

14. A tool as recited in claim 11, wherein said adjustable blade assembly comprises:
   (a) a blade housing adapted to slide within a bore in said frame from a first position to a second position;
   (b) a scoring blade mounted to said blade housing such that the blade can reside in the first cylindrical bore when the housing is in a first position; and
   (c) means for moving the blade housing from a first position to a second position.

15. The tool as recited in claim 14, wherein said means for moving the blade housing comprises a lever arm pivotally mounted to the frame and connected to the blade housing such that movement of the lever arm moves the blade housing from a first position to a second position.

16. A device for preparing an end of an insulated cable comprising:
   (a) a rotatable tubular body having an axis of rotation and a central bore, said bore centered in said axis of rotation;
   (b) means for scoring the exterior sheathing of a cable radially disposed in said bore;
   (c) means for cutting sheathing and insulation from a cable:
   (d) means for imparting rotation to said tubular body around said axis of rotation; and
   (e) a bearing and a bearing cap positioned at a distal end of said central bore.

17. A device as recited in claim 16, wherein said means for scoring exterior sheathing comprises a scoring blade assembly coupled with said tubular body, said assembly having a retractable scoring blade.

18. A device as recited in claim 17, wherein said scoring blade assembly comprises:
   (a) a blade housing adapted to slide within a bore in a frame from a first position to a second position;
   (b) a scoring blade mounted to said blade housing such that the blade can reside in said central bore when the housing is in a first position; and
   (c) means for moving the blade housing from a first position to a second position.

19. The tool as recited in claim 18, wherein said means for moving the blade housing comprises a lever arm pivotally mounted to the frame and connected to the blade housing such that movement of the lever arm moves the blade housing from a first position to a second position.

* * * * *